United States Patent [19]
Widman et al.

[11] Patent Number: 6,116,696
[45] Date of Patent: Sep. 12, 2000

[54] INTERLOCKING DETACHABLE SEAT BELT SYSTEM

[75] Inventors: Aaron M. Widman, Utica; Dean Nightingale, Birmingham, both of Mich.

[73] Assignee: Autoliv ASP, Inc., Ogden, Utah

[21] Appl. No.: 09/220,812

[22] Filed: Dec. 23, 1998

Related U.S. Application Data

[63] Continuation-in-part of application No. 09/129,833, Aug. 5, 1998, abandoned.

[51] Int. Cl.[7] .................................................. B60R 22/00

[52] U.S. Cl. ............................. 297/483; 24/632; 24/633; 280/808

[58] Field of Search ...................................... 297/468, 474, 297/475, 481, 483; 280/808; 24/630, 632, 633, 637

[56] References Cited

U.S. PATENT DOCUMENTS

| | | | |
|---|---|---|---|
| 4,289,328 | 9/1981 | Repp et al. | 280/808 X |
| 5,123,673 | 6/1992 | Tame | 280/808 X |
| 5,263,741 | 11/1993 | Seros et al. | 280/808 |
| 5,401,072 | 3/1995 | Farrand | 297/483 X |
| 5,992,884 | 11/1999 | Gillespie et al. | 297/481 X |

*Primary Examiner*—Peter R. Brown
*Attorney, Agent, or Firm*—Sally J. Brown

[57] ABSTRACT

A detachable three point seat belt system having an interlocking mechanism that requires the wearer to reattach a detached system to the seat prior to fastening the seat belt over the wearer's body. This invention specifically addresses the need of three point seat belt systems, which will operate at any seating position within the vehicle, including a front seat, a rear seat, a side seats and/or a center seat within the vehicle. This invention provides a nearly foolproof three-point continuous seat belt system while maintaining significant design flexibility, including detachability and seat adaptability.

10 Claims, 5 Drawing Sheets

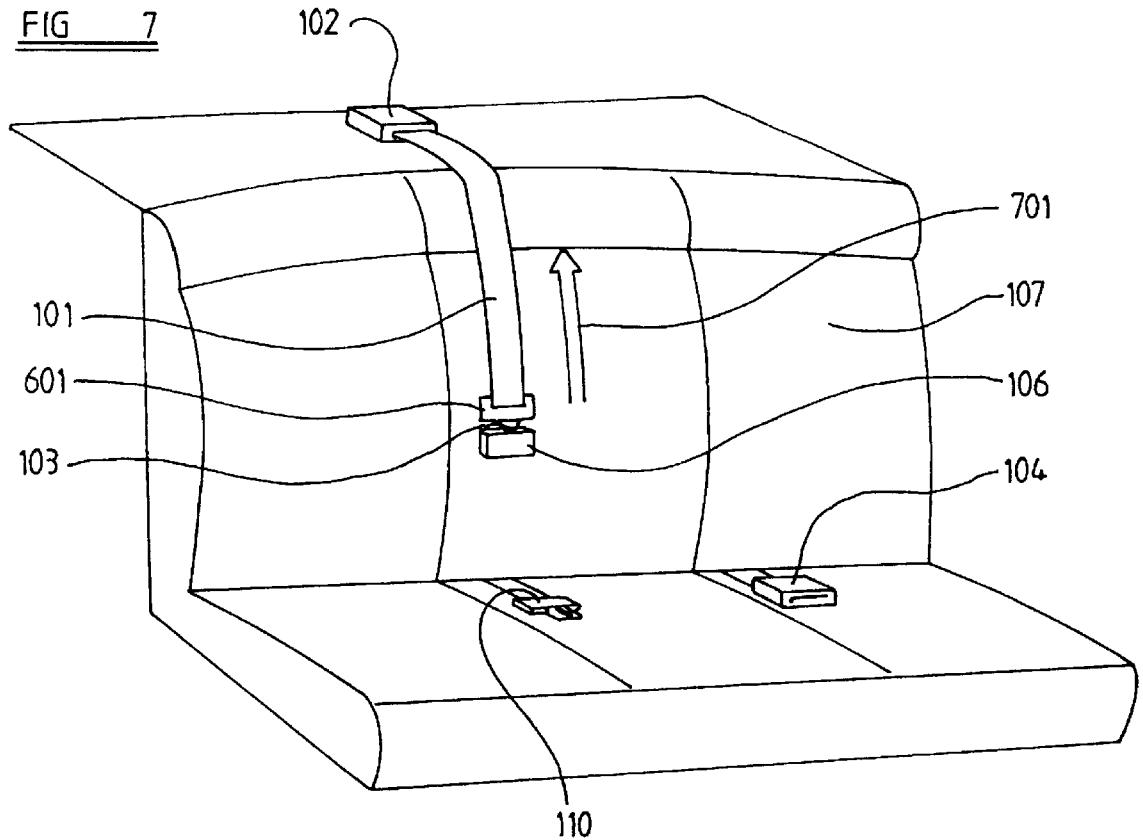
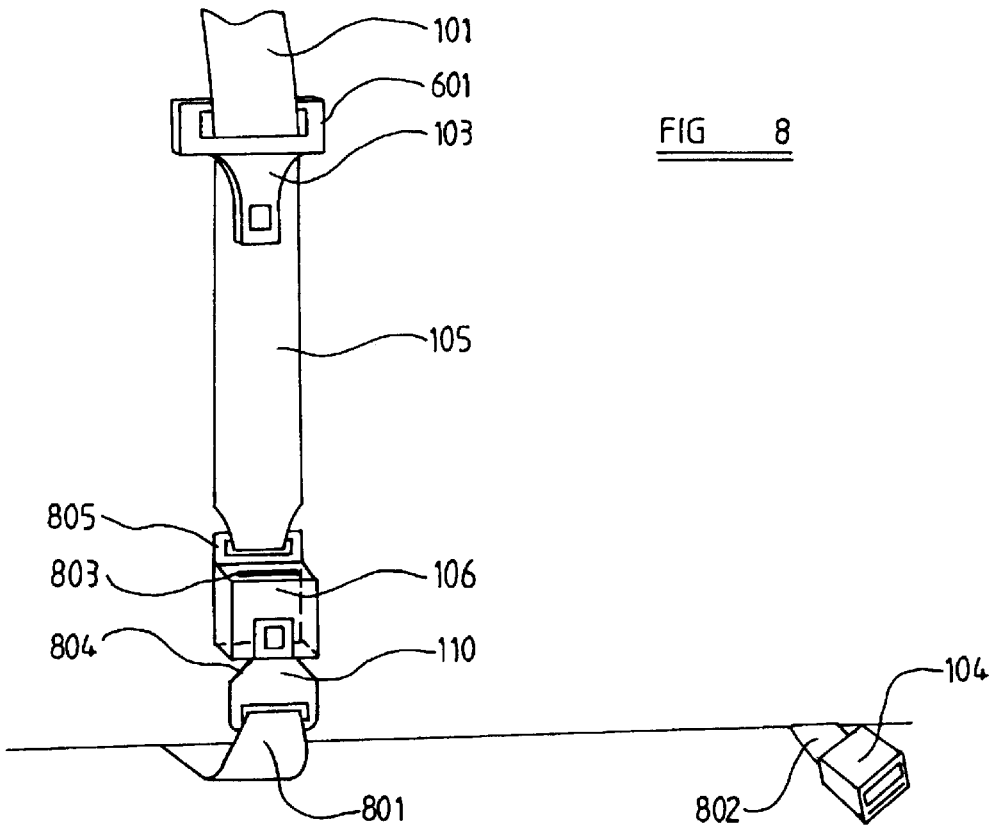

INTERLOCKING DETACHABLE SEAT BELT SYSTEM

This application is a Continuation-in-Part, under 37 CFR 1.60, of patent application Ser. No. 09/129,833, filed on Aug. 5, 1998 now abandoned. Priority of the parent application for all common material is hereby claimed.

BACKGROUND OF THE INVENTION

1. Field of the Invention

This invention relates to automobile occupant restraints. More specifically, this invention relates to detachable seat belt systems, which provide continuous three-point attachment to the vehicle.

2. Description of Related Art

Automobile occupant restraints, including seat belt devices and systems are important and well-known components of automobile safety systems. When an automobile experiences sudden deceleration a properly belted in occupant is held in place by the webbing, thereby avoiding many serious, if not fatal, physical collisions with the interior of the vehicle, the windows, and/or being thrown from the vehicle. Since their introduction seat belts have saved countless lives and reduced the severity of injury in countless more. Initially seat belts provided only a belt across the lap of the occupant. Although an improvement over no belt at all, such lap only belts did nothing to restrain the very dangerous forward and downward motion of the occupant's upper body. Head, neck and back injuries are very common among victims of vehicle collisions who are wearing only lap belts. A natural improvement to lap belts was the introduction of a third point connection, that is a second "belt" which is connected on one end to the roof or upper side of the vehicle and on the other end to the lap belt. These improved lap belts are referred to as "3-point" belts because they provide three fixation points for the webbing. 3-point belts improve the performance of seat belt systems by restricting the forward and downward motion of the occupant's upper body. However, existing 3-point belts have several important limitations, including the difficulty of installation for center seats, the difficulty of making it detachable for removable seats, the ease of disabling the shoulder portion, thereby eliminating the primary advantage of 3-point belts, and the imposition of additional cost and weight of automobiles.

A wide variety of seat belt restraints and components have been previously described or suggested in prior U.S. Patents, including the following U.S. Pat. Nos.: 3,584,896, 3,708,838, 3,741,494, 3,756,288, 3,756,339, 3,794,135, 3,796,442, 3,799,610, 3,820,843, 3,823,978, 3,841,654, 3,847,434, 3,854,749, 3,865,397, 3,866,944, 3,869,145, 3,888,509, 3,888,541, 3,891,272, 3,897,105, 3,897,963, 3,923,321, 3,929,205, 3,931,988, 3,941,419, 3,957,283, 3,958,812, 3,960,339, 3,968,978, 3,984,128, 3,997,190, 4,005,904, 4,008,909, 4,014,480, 4,027,900, 4,034,931, 4,050,717, 4,062,091, 4,063,778, 4,065,156, 4,069,988, 4,079,964, 4,081,052, 4,083,602, 4,126,356, 4,139,215, 4,149,918, 4,154,472, 4,164,336, 4,165,100, 4,177,962, 4,189,170, 4,195,392, 4,221,403, 4,232,433, 4,225,155, 4,264,089, 4,266,811, 4,272,105, 4,274,657, 4,286,804, 4,317,584, 4,322,096, 4,323,267, 4,336,957, 4,355,442, 4,358,878, 4,371,128, 4,396,228, 4,461,493, 4,470,618, 4,473,242, 4,489,804, 4,496,170, 4,498,642, 4,502,710, 4,519,652, 4,521,034, 4,531,762, 4,537,363, 4,541,654, 4,549,749, 4,569,536, 4,572,543, 4,575,119, 4,579,294, 4,600,217, 4,635,963, 4,642,857, 4,659,108, 4,666,097, 4,674,303, 4,676,556, 4,679,821, 4,697,827, 4,702,491, 4,703,827, 4,706,992, 4,720,147, 4,730,875, 4,765,651, 4,789,179, 4,789,184, 4,795,189, 4,818,022, 4,832,365, 4,832,367, 4,834,427, 4,840,402, 4,861,071, 4,938,502, 4,940,254, 4,987,662, 5,000,481, 5,004,178, 5,009,469, 5,014,401, 5,139,311, 5,156,436, 5,165,149, 5,176,402, 5,215,354, 5,255,940, 5,303,979, 5,313,690, 5,329,676, 5,335,957, 5,340,198, 5,352,024, 5,369,855, 5,387,029, 5,421,614, 5,421,615, 5,464,252, 5,472,236, 5,496,080, 5,553,924, 5,590,907, 5,605,380, 5,628,548, 5,655,793, 5,725,248, each of which is recommended to the reader for background information and is incorporated by reference in its entirety for the material contained therein.

U.S. Pat. No. 3,584,896 describes a combination seat belt buckle in which one of a series of loops towards the end of a retractable shoulder harness strap engages a hook formed on the buckle release fitting.

U.S. Pat. No. 3,708,838 describes a push button buckle for use in a safety restraint system in combination with a mating tongue plate connector whereby only a small force is required to release the buckle from the mating connector even when the restraint system is in tension through the application of a load.

U.S. Pat. No. 3,741,494 describes an energy absorber for automobile safety belts which comprises a mounting coupled to a chassis, a take-up member, and a torsion bar.

U.S. Pat. No. 3,756,288 describes webbing for use in seat belts and the like having a multiple step give.

U.S. Pat. No. 3,756,339 describes a safety seat belt control apparatus in which ends of the belt sections are carried on spring impelled retracting drums.

U.S. Pat. No. 3,794,135 describes a seat belt occupant restraint arrangement of the "passive safety belt" type, in which a seat belt is automatically placed in position around the body of an occupant of a seat in a motor vehicle in response to the closing of a vehicle door adjacent said seat.

U.S. Pat. No. 3,796,442 describes a safety device for a seat in a vehicle body, comprising a safety belt and an arm pivotable between a first position and a second position.

U.S. Pat. No. 3,799,610 describes a seat belt buckle for use by occupants of vehicles including first and second metal members, and first and second belts respectively attached to said firs and second members.

U.S. Pat. No. 3,820,843 describes a weight belt restraining structure having a webbing with a multiple step give.

U.S. Pat. No. 3,823,978 describes a seat harness or safety belt comprising a first assembly adapted to be mounted at one side of a seat and including a first part of a two-part fastening buckle.

U.S. Pat. No. 3,841,654 describes a vehicle safety system which comprises a seat belt having an inflated section which is normally maintained in an uninflated state and adapted to be positioned about a wearer when the wearer is seated in a seat within the vehicle, sensing means actuatable in response to the occurrence of a preselected condition of the vehicle, and inflating means responsive to actuation of the sensing means and capable of inflating the inflatable section prior to any substantial forward motion of the set belt wearer relative to his seat as a result of the preselected condition.

U.S. Pat. No. 3,847,434 describes a vehicle occupant restraint system comprising a retractor adapted to be mounted adjacent the floor of said vehicle and having seat belting attached thereto, means for retracting said seat belting onto said retractor and for permitting said seat belting to be protracted from said retractor and bracket means adapted to be mounted in said vehicle.

U.S. Pat. No. 3,854,749 describes a safety belt installation designed to enable a vehicle user to accede to and leave his seat easily and to ensure that the user is necessarily wearing his safety belt when he is seated, no catch or buckle being required.

U.S. Pat. No. 3,865,397 describes a vehicle safety belt system with which at least one safety belt is attached to at least one attachment point in the vehicle door adjacent the seat served by the belt.

U.S. Pat. No. 3,866,944 describes a locking device for a seat belt releasably binding the occupant to the seat in a vehicle, in which a seat belt retractor carrying one end portion of the seat belt is disposed in the vehicle door or compartment and means for automatically locking and unlocking the seat belt retractor in interlocking relation with the closure and opening of the vehicle door are provided.

U.S. Pat. No. 3,869,145 describes a self applying three point automatically inflatable vehicle safety lap and shoulder belt that includes inflatable fibrous lap and shoulder belts joined at one end to a coupling ring and at their other ends to inertia locked spring biased retraction reels.

U.S. Pat. No. 3,888,509 describes a safety harness for automobile drivers and occupants in which a continuous single piece of webbing or belting provides a lap belt support and a shoulder harness extending bifurcation-like loops over the shoulders of the user.

U.S. Pat. No. 3,888,541 describes a belt locking assembly that is slidably mounted on a continuous length of safety belt, which forms a shoulder belt and a lap belt.

U.S. Pat. No. 3,891,272 describes a motor vehicle safety belt system that includes a switch actuated by the engagement of the driver's safety belt and a network for starting the vehicle engine upon the acutation of the switch.

U.S. Pat. No. 3,897,105 describes a vehicle safety belt system that includes a seat having a seat portion and a back portion provided with openings proximate its lower corners and at its upper side sections.

U.S. Pat. No. 3,897,963 describes a passive safety device for a passenger in a automobile includes a shoulder safety belt extending diagonally across the passenger's body and fastened at one end to a door of the automobile.

U.S. Pat. No. 3,923,321 describes a safety belt arrangement for a vehicle seat including a shoulder safety belt mounted at one end adjacent the seat portion of the vehicle seat.

U.S. Pat. No. 3,931,988 describes a safety device for a passenger in an automobile that comprises a shoulder safety belt extending diagonally across the passenger's body and an energy absorbing impact element located on the vehicle frame adjacent the passenger's knees.

U.S. Pat. No. 3,929,205 describes an automatically applied three point safety belt system includes a retractor reel located at one side of the vehicle seat and spring rewinding an inflatable tubular lap belt which is arcuate in its inflated state and a retractor reel located at the same side of the seat back above the occupant shoulder level and spring rewinding a shoulder belt having a rear inflatable tubular sections which upon inflation, extends horizontally, forwardly of the occupant's shoulder.

U.S. Pat. No. 3,941,419 describes a buckle component of a vehicle occupant restraint belt system which is slidably disposed on a restraint belt of the system in an improved manner.

U.S. Pat. No. 3,957,283 describes a one-way spring loaded connector for single retractor continuous loop restraint system, where one end of a length of webbing is anchored near the vehicle seat and the other end of the webbing is anchored near the roof of the automobile, a releasable anchor for releasably anchoring a central portion of the webbing is provided so that the portion of webbing is provided so that the portion of the webbing from the floor anchor to the releasable anchor becomes a lap belt and the portion from the roof mounted anchor to the releasable anchor becomes a shoulder belt.

U.S. Pat. No. 3,958,812 describes a safety belt system for use in a moving vehicle comprising a lap belt and a shoulder belt interconnected and provided with at least one lock half which lock half is engaged by a reciprocating lock half, said lap belt and said shoulder belt disposed to overlie a passenger seated on a seat of said vehicle, which improvement comprises a tensioned strap connected to the vehicle at one end and to the safety belt system on the other end proximate the junction of said lap belt and said shoulder belt, said lap belt and said shoulder belt being held by said tensioned strap above the horizontal plane of said vehicle.

U.S. Pat. No. 3,960,339 describes a vehicular safety belt retractor that has a belt locking means including a spool with ratchet end flanges, a pawl, and an inertia-responsive means for moving the pawl.

U.S. Pat. No. 3,968,978 describes an automatic safety belt apparatus for restraining the occupant sitting on the seat of a motor vehicle, which comprises a plurality of elements which operatively cooperate so that when the door of a vehicle is closed from an open position, the safety belt automatically position itself around both the hip and the shoulders of the occupant.

U.S. Pat. No. 3,984,128 describes a safety device for a passenger in an automobile comprising a shoulder safety belt extending diagonally across the passenger's body and an energy absorbing impact element located on the vehicle frame adjacent the passenger's knees.

U.S. Pat. No. 3,997,190 describes a safety arrangement for motor vehicles that includes a safety belt for retaining a vehicle occupant on a seat.

U.S. Pat. No. 4,005,904 describes a run through bracket consisting of a lashing to be fastened to the automobile body and a ring held by the lashing with an opening through which the belt runs.

U.S. Pat. No. 4,008,909 describes an actuator for safety seat belt system having a gas generator integrally formed with a piston connected to a seat belt.

U.S. Pat. No. 4,014,480 describes a seat belt retractor of the type in which the belt is wound on a spring actuated spool.

U.S. Pat. No. 4,027,900 describes a seat belt assembly having two belts attached to the free end of a horizontal pivot arm and having its base pivotally mounted to the roof of the car.

U.S. Pat. No. 4,034,931 describes an automatic locking seat belt retractor.

U.S. Pat. No. 4,050,717 describes a seat belt system having a lap belt take-up shaft for a seat belt retractor is arranged horizontally and substantially orthogonally to the traveling direction of a vehicle, whereby damage to the lap belt due to the drawing-out and rolling-in thereof is prevented.

U.S. Pat. No. 4,062,091 describes a seat belt buckle having a latch member biased to a position of engagement by a pressure spring.

U.S. Pat. No. 4,063,778 describes an individual, personalized body restraining device for seat occupant of a seat of any fast moving conveyance, the device including in its basic configuration the protective elements of the seat belt, two shoulder straps, chest shield, head and chin guard, with a head rest and stomach plastron.

U.S. Pat. No. 4,065,156 describes a seat belt system having a first and second slip joint, a retractor, a shoulder belt and a lap belt.

U.S. Pat. No. 4,069,988 describes a retracting device for a safety belt which comprises a mandrel rotatably mounted on a support and around which the belt is wound.

U.S. Pat. No. 4,079,964 describes retractors for shoulder belts and retractors for lap belts which are transversely positioned, relative to the longitudinal axis of the vehicle.

U.S. Pat. No. 4,081,052 describes a safety seat belt locking device for vehicles, comprising a relay with an adjustable time delay, a solenoid device connected to a locking-lever and an impact-responsive switch.

U.S. Pat. No. 4,083,602 describes a webbing guide for use with a three-point seat belt comprising a lug member mounted to a rear side end portion of a seat so as to hold a tongue plate provided at an intermediate mounting portion of the webbing of the seat belt when the seat belt is not used and to guide one end of a lap belt portion of the seat belt when it is worn by a man sitting on the seat.

U.S. Pat. No. 4,126,356 describes a seamless combined vehicle safety shoulder and waist belt has a shoulder section which is plastically elongatable and of high energy absorption, and a waist section of high tensile strength.

U.S. Pat. No. 4,139,215 describes an automotive safety belt including means facilitating disengagement of the belt in an emergency, and wherein the belt includes an auxiliary latch having a release strap so positioned as to be readily accessible while still permitting buckling and unbuckling of the belt in the conventional fashion.

U.S. Pat. No. 4,149,918 describes a method and apparatus for reducing the sizes of the kerfs of safety belts made from severed webs of woven synthetic filaments such as polyamide or polyester filaments.

U.S. Pat. No. 4,154,472 describes a method and apparatus for protecting an occupant of a vehicle during a crash comprising reorienting the occupant quickly during the first half of a crash cycle period into an energy absorbing position.

U.S. Pat. No. 4,164,336 describes a dual spool side by side retractor structure on a common frame wherein both spools are acted upon by a common lock pawl element, the lock pawl element engaging the ratchet teeth of the one of the two spools and then being positively and guidably driven by the first spool to powered engagement with the other of said two spools and the guiding occurring as a consequence of cam surfaces directing the pawl-to-ratchet engagement.

U.S. Pat. No. 4,165,100 describes a mechanism of automatically applying a three-point waist and shoulder belt to a vehicle seat occupant includes a first belt guide slidably along a track on the vehicle door in an inclined direction and a second belt guide connected at one end to a retractor belt which is connected to an inertia responsive belt retractor at the side of the seat opposite the door.

U.S. Pat. No. 4,177,962 describes a winding-in device for vehicle safety belts of the kind having a shaft, rotatably mounted in a housing to receive the safety belt, which is withdrawable, and having locking means by which said shaft is locked against further rotation in the withdrawal direction when a predetermined limiting level of angular acceleration is exceeded, and further having an inertia body, rotatable on and with said shaft, which, when said limiting level is exceeded, lags behind the rotary movement of said shaft in opposition to the effect of spring means which connect it to said shaft, in order to bring at least one locking pawl, which is mounted to a pivot in a flange on said shaft, into engagement with a ring of teeth secured to said housing via a cam track.

U.S. Pat. No. 4,189,170 describes a three-point passive safety belt system, providing both lap and upper torso belt portions adapted to provide maximum exit and entry convenience without utilization of mechanical means for pulling the belts away from the vehicle door opening.

U.S. Pat. No. 4,195,392 describes a seat belt buckle device having a latch device comprising a base, a latch member, a tongue, a push button, and a cover.

U.S. Pat. No. 4,221,403 describes a three-point safety belt for use in an automobile having a body containing a door where the three-point safety belt is secured at one end to the body and at the other end to a region of the body proximate the door.

U.S. Pat. No. 4,225,155 describes an automobile safety device of the type having a shoulder safety belt extending diagonally across the upper body of a passenger and connected to a slide displaceable in a guide attached to the automobile frame.

U.S. Pat. No. 4,232,433 describes a seat belt buckle device having a latch device comprising a base, a latch member, a tongue, a push button, and a cover.

U.S. Pat. No. 4,264,089 describes a seat belt mechanism comprising a first through member attached to a sash of a door, a second through member supported in the door, a shoulder belt, and a waist belt.

U.S. Pat. No. 4,266,811 describes a passive seat belt system for use in a vehicle with a seat belt displacing device, in which the seat belt can be fully displaced to passenger releasing position in response to only partial opening of the vehicle door.

U.S. Pat. No. 4,286,804 describes a seat-belt system for a vehicle, automatically restraining and releasing the driver or a passenger in response to the closing and opening of the door.

U.S. Pat. No. 4,272,105 describes a passive seat belt system having a torso belt that in passenger restraining position extends over upper torso of the seat occupant from a fixed roof rail attachment to a retractor mechanism anchored at the inboard side of occupant seating position.

U.S. Pat. No. 4,274,657 describes an automatic seat belt restraining system which is to be used in a vehicle of the type having a passenger compartment including a seat therein.

U.S. Pat. No. 4,317,584 describes a passive vehicle occupant restraint belt system comprising a belt leading from an inboard location adjacent the lower rear portion of the seat to an outboard location adjacent the rear edge of the vehicle door.

U.S. Pat. No. 4,322,096 describes a passive restraint harness system that provides for the deployment of a safety belt.

U.S. Pat. No. 4,323,267 describes a passive belt system which comprises a shoulder belt leading from a retractor inboard of the seat to an anchor on the upper rear corner of the door and a waist belt leading from a retractor outboard of the seat to a buckle affixed to the shoulder belt at an intermediate point which is inboard of the occupant when the door is closed.

U.S. Pat. No. 4,336,957 describes a passive safety belt system for motor vehicles that has a belt extending from a point of attachment at the floor of the vehicle via a redirecting fitting attached to the door.

U.S. Pat. No. 4,355,442 describes a connecting device for an automobile seat belt that includes a tag and a buckle.

U.S. Pat. No. 4,358,878 describes a plug fastener for safety belts in motor vehicles, which comprises a tongue-like plug part and a receiving part for receiving and retaining the tongue-like plug part.

U.S. Pat. No. 4,371,128 describes an emergency spool release for use with a seat belt retractor mechanism.

U.S. Pat. No. 4,396,228 describes an integrated shoulder harness and lap belt restraint apparatus having two shoulder straps of webbing attached to an upper anchor point and extended therefrom over opposite shoulders of an occupant, through shoulder strap length adjusters, and then downwardly along the sides of an occupant's upper torso to side anchors located adjacent the opposite sides of the seat pan.

U.S. Pat. No. 4,461,493 describes a seat belt retractor having a tension relieving mechanism with a new and improved control and release means for operating the mechanism to release the tension relieving mechanism from its tensionless mode and allow seat belt retraction.

U.S. Pat. No. 4,470,618 describes an adjustable seat belt anchorage comprising a guide member, a slider, a latch, and a means for urging the latch piece toward an interlocking position.

U.S. Pat. No. 4,473,242 describes a safety belt system including a retractor mounted on the set and directly involving the lap belt section.

U.S. Pat. No. 4,489,804 describes a strap retractor assembly of a seat belt arrangement.

U.S. Pat. No. 4,496,170 describes a three-way seat belt device for a vehicle that has a retractor mounted on the side wall of the vehicle body.

U.S. Pat. No. 4,498,642 describes a dual spool seat belt retractor system where one retractor reels in a shoulder belt and another retractor reels in a lap belt and at least one of the retractors, e.g., the shoulder belt retractor, has an associated tension relieving mechanism which relieves the winding spring tension from the belt worn by the occupant, a device associated with the tension relieving mechanism for releasing the mechanism from its tension relieving mode is actuated by a cable extending between the two retractors.

U.S. Pat. No. 4,502,710 describes a passive vehicle occupant restraint belt system that comprises a movable anchor which is moved by a driven transfer element along a guide rail between a release location.

U.S. Pat. No. 4,519,652 describes a strap retractor assembly of a vehicular seat belt arrangement.

U.S. Pat. No. 4,521,034 describes a passive vehicle occupant restraint belt system that comprises an anchor which is moved by a driven transfer element along a guide rail.

U.S. Pat. No. 4,531,762 describes a three-way seat belt device for use in a vehicle body, that employs a seat belt having one end secured within a retractor fixed to the vehicle body.

U.S. Pat. No. 4,537,363 describes a lock-up mechanism for a vehicle sensitive automotive seat belt retractor.

U.S. Pat. No. 4,541,654 describes a safety belt arrangement in motor vehicles, in which the belt has a band portion which during use runs from a real mechanism on one side of the vehicles seat, diagonally across the seat-back to a belt lock on the opposite side of the seat.

U.S. Pat. No. 4,549,749 describes a web guide for a three point seat belt system integrated into a pillar of an automotive vehicle.

U.S. Pat. No. 4,569,536 describes a seat belt system including: a seat belt device including at least one seat belt and at least one seat belt drive device thereof; two electrodes; a heart beat calculating circuit for receiving signals detected at the electrodes and calculating a heart beat in response to signals from the electrodes; and a control circuit for outputting a control signal to the seat belt drive device to wind or unwind the seat belt in response to the heart beat signal from the heart beat calculating circuit.

U.S. Pat. No. 4,572,543 describes a retractable safety belt system for restraining a vehicle occupant in a seat comprising a seat belt secured at one end to a reel of an electric-motor driven retractor.

U.S. Pat. No. 4,575,119 describes a seat belt device including a webbing having one end movable back and forth with a lever.

U.S. Pat. No. 4,579,294 describes an emergency locking retractor (ELR) for a safety seat belt system.

U.S. Pat. No. 4,600,217 describes an apparatus for automatically moving the tongue of a seat belt into a position in which it may conveniently be grasped by an operator for insertion into a buckle.

U.S. Pat. No. 4,635,963 describes a seat belt device having a seat belt one end of which is moved back and forth by a lever. The other end of the seat belt is connected to a retractor mounted on the vehicle body, and the intermediate portion of the seat belt is loosely fitted though a hanger mounted on the vehicle body.

U.S. Pat. No. 4,642,857 describes a belt buckle assembly.

U.S. Pat. No. 4,659,108 describes a seat belt system of the conventional there point restraint type which includes an electric motor which replaces the unusual rewind spring on the belt retractor.

U.S. Pat. No. 4,666,097 describes a seat belt winding apparatus with a rotation detection unit, for detecting a rotation of a belt winding shaft, and a driving unit, controlled by a detection signal from the rotation detection unit so as to apply a winding force to the belt winder shaft.

U.S. Pat. No. 4,674,303 describes a safety lock for a seat belt buckle.

U.S. Pat. No. 4,676,556 describes a belt anchoring device which is incorporated with a slidable seat.

U.S. Pat. No. 4,679,821 describes a seat belt apparatus, for use in a vehicle, that includes a webbing extending from a retractor upward along a center pillar of the vehicle and after passing through a slot of a through-anchor mounted at the top of the center pillar extends downward to have its forward end connected to an arm pivotally mounted on the vehicle.

U.S. Pat. No. 4,697,827 describes a seat belt device provided with a reach arm having a fore end to which a free end of a seat belt is tied when the seat belt is not in use.

U.S. Pat. No. 4,702,491 describes a quick disconnect three point safety restraint system for use in motor vehicles having a retractor means.

U.S. Pat. No. 4,703,827 describes a safety apparatus for removing the steering wheel of an automotive vehicle from a zone of potential impact with the head of the driver, in case of collision, including a substantially unstretchable connecting member between the steering wheel and a part of the vehicle likely to move forwardly relative to the chassis in case of collision and transferring such movement to the steering wheel to withdraw it towards the dashboard.

U.S. Pat. No. 4,706,992 describes a seat belt to be coupled to and use in conjunction with the existing seat belt in an automobile or other motor vehicle.

U.S. Pat. No. 4,720,147 describes an adjustable vehicle seat belt anchor that comprises an elongated rail member and a slide member slidably received by the rail member.

U.S. Pat. No. 4,730,875 describes a webbing guide for use with a seat belt apparatus.

U.S. Pat. No. 4,765,651 describes an adjustable seat belt system having a plurality of anchor fittings where one or more anchoring slide block fittings comprise a gear mounted to the anchoring slide block for positioning the anchoring slide block along a track by a manual rotation device or electric motor for rotating the gear interacting with a rack located on the track.

U.S. Pat. No. 4,789,179 describes an arrangement for holding, when a seat belt is not in use, a buckle mounted anchor band of the seat belt on a given portion of a seat back of a seat.

U.S. Pat. No. 4,789,184 describes a passive seat belt system equipped with a guide rail, a slide anchor, and a drive means for causing the slide anchor to move along the length of the guide rail.

U.S. Pat. No. 4,795,189 describes an impact activated automotive safety system relying upon relative movement between a drive unit and a chassis of an automobile and comprising a plurality of cables attached to the chassis.

U.S. Pat. No. 4,818,022 describes a seat belt anchor equipped seat slide device having a channel member interposed between the frame of a seat cushion and a movable rail of a seat slide device.

U.S. Pat. No. 4,832,365 describes a passive seat belt system that includes a timer and a control means.

U.S. Pat. No. 4,832,367 describes a belt restraining apparatus which includes a shoulder belt portion and a lap belt portion.

U.S. Pat. Nos. 4,834,427 and 4,861,071 describe an anchoring device for use with a seat belt worn in a vehicle.

U.S. Pat. No. 4,840,402 describes an automatic locking and releasing arrangement for a vehicular seat belt.

U.S. Pat. No. 4,938,502 describes an automatic locking and releasing arrangement for a vehicular seat belt.

U.S. Pat. No. 4,940,254 describes a seat belt holder position adjuster, which adjusts the height of a belt holder that supports an uppermost portion of a shoulder belt part of the seat belt.

U.S. Pat. No. 4,987,662 describes a seat belt release guard consisting of a base channel detachable secured to the buckle element of a seat belt so that the buckle rests in the channel and secures the channel to the buckle.

U.S. Pat. No. 5,000,481 describes a seat belt locking device utilized to temporarily modify a shoulder/lap belt occupant restraint system in a vehicle to secure a child's restraint seat.

U.S. Pat. No. 5,004,178 describes a seat belt apparatus that includes a take-up mechanism, a webbing strap, a webbing detection mechanism, and a restraining mechanism.

U.S. Pat. No. 5,009,469 describes a vehicle seat for use with at least tow seatbelt assemblies.

U.S. Pat. No. 5,014,401 describes a seat belt system having a plurality of seat belt units with buckle apparatuses each having a tongue plate and a buckle plate for receiving and engaging the tongue plate.

U.S. Pat. No. 5,139,311 describes an automotive seat having a seat belt buckle holder.

U.S. Pat. No. 5,156,436 describes a vehicle safety restraint for pregnant women.

U.S. Pat. No. 5,165,149 describes a seat belt buckle and seat belt buckle attachments that are designed in such a manner that the seat belt can be put on quickly and smoothly.

U.S. Pat. No. 5,176,402 describes a three-point belt assembly that is mounted to the seat frame and is removably mounted to a vehicle.

U.S. Pat. No. 5,215,354 describes a vehicle safety restraint for pregnant women.

U.S. Pat. No. 5,255,940 describes a three-point seat belt repositioning device for use by occupants, including children, who may be of shorter than average stature.

U.S. Pat. No. 5,303,979 describes an infant-restraining protective seat.

U.S. Pat. No. 5,313,690 describes a buckle pretensioner for a seat belt system that includes a support member on which a buckle is mounted for movement generally downwardly from a normal upper position to a pretensioning lower position in which pretension is applied to the seat belt.

U.S. Pat. No. 5,329,676 describes a buckle device of a seat belt unit and the method for connecting a buckle cover in said buckle device.

U.S. Pat. No. 5,335,957 describes a restraint device which includes an open ended tubular guide member which is generally cylindrical or elliptical in cross-section and in which the interior surfaces of the tubular member define a longitudinal passageway for receiving and engaging portions of both the shoulder harness and lap portions of a three-point vehicular restraint system.

U.S. Pat. No. 5,340,198 describes a safety belt adjustment device and a safety belt system are disclosed in which an automobile shoulder belt is adjusted by a device mountable on the shoulder belt.

U.S. Pat. No. 5,352,024 describes a vehicle safety restraint for pregnant women.

U.S. Pat. No. 5,369,855 describes a buckle for a seat belt that has a double lock function for latching even against impact in any direction without impairing the normal operability.

U.S. Pat. No. 5,387,029 describes a buckle pretensioner for a vehicle seat belt system of the type that is mounted on a vehicle seat.

U.S. Pat. No. 5,421,614 describes a seat belt adjuster adapted to receive a conventional seat belt and to pull the seat belt to a position around the child's waist so that the shoulder strap does not extend across and interfere with the child's face.

U.S. Pat. No. 5,421,615 describes a seat belt apparatus in which a hook is formed on a boot covering an anchor plate.

U.S. Pat. No. 5,464,252 describes an anchor device for a seat belt for connecting a webbing for restraining an occupant to a seat so that a load applied to the webbing is received by the vehicle body.

U.S. Pat. No. 5,472,236 describes a seat belt shoulder strap adjustment guide apparatus.

U.S. Pat. No. 5,496,080 describes a lock with automatically latching and its use especially for a removable vehicle seat.

U.S. Pat. No. 5,553,924 describes a vehicle safety seat system includes a contoured vehicle seat bottom and a foam layer disposed over the supporting vehicle seat bottom and supported by the supporting vehicle seat bottom.

U.S. Pat. No. 5,590,907 describes a device for automatically positioning a shoulder harness of a vehicle retractable seat belt for maximum fit and comfort of a vehicle occupant regardless of the body size of the occupant, and including a shoulder harness positioning guide for automatically positioning the shoulder harness of the safety belt over the torso of a seat occupant.

U.S. Pat. No. 5,605,380 describes a seat belt adjuster for holding the shoulder belt to the lap belt of an automotive seat belt at a fixed distance to create a compound angle of assent of the shoulder belt to prevent it from crossing the occupant's face or neck.

U.S. Pat. No. 5,628,548 describes a safety restraint system for vehicles such as airplanes, which includes a primary support harness having an upper support portion secured to an upper portion of an airline seat, a lower support portion secured to the upper support portion so that the lower support portion extends across the torso of an adult person seated in the airline seat.

U.S. Pat. No. 5,655,793 describes a webbing height adjuster comprising a lock pin adjusting slider, a covering member fixed to the lock pin adjusting slider and a bolt for supporting a slip anchor which is fixed to the slider.

U.S. Pat. No. 5,725,248 describes a webbing height adjuster of the invention is formed of a movable member disposed on a guide rail on a vehicle to be slidable in the longitudinal direction; a lock pin; a control member; and a driven pin.

SUMMARY OF THE INVENTION

It is desirable to provide a detachable seat belt system, which includes an interlocking mechanism contained within the lap belt tongue assembly. Moreover, it is desirable to provide a seat belt system which, when attached, requires its use as a three-point continuous loop system. It is also desirable to provide a three-point seat belt system that is adapted to protect vehicle occupants in all standard seating positions, including rear center seats.

Accordingly, it is the general object of this invention to provide a detachable three-point seat belt system adapted to meet the requirements of rear center seat occupants.

It is a further object of this invention to provide a detachable three-point seat belt which, when attached, can only be used as a three-point continuous loop seat belt.

It is another object of this invention to provide a detachable three-point seat belt, which minimizes the weight impact of installing the system in the vehicle.

Another object of this invention is to provide a detachable three-point seat belt system, which is adapted to facilitate flexibility in vehicle seating.

These and other objects of this invention are intended to be covered by this disclosure and are readily apparent to those of ordinary skill in the art upon review of the following drawings, detailed description and claims of this disclosure.

BRIEF DESCRIPTION OF THE DRAWINGS

FIG. 7 depicts a detailed view of the interlocking buckle in the attached configuration of the preferred embodiment of the invention.

FIG. 8 depicts a detailed view of the interlocking buckle transitioning from the attached to the detached configuration of the preferred embodiment of the invention.

DETAILED DESCRIPTION OF THE INVENTION

This invention is a detachable three-point seat belt system for use in vehicles. This seat belt system is adapted to address specifically the objective of providing nearly foolproof three-point seat belts that can be used at any standard seating position, particularly rear and center seats. Moreover, this invention provides a seat belt system that is easily detachable, permitting the seat to be folded down and potentially removed from the vehicle. A three-point seat belt is one which provides three fixed attachment points, typically including the right side of the occupant's waist, the left side of the occupant's waist, and above either, or both, of the occupant's shoulders. This invention, in its preferred embodiment, includes the following components: a body-mounted belt and retractor assembly, having a fixed interlocking buckle and an adjustable (slip) tongue; a seat-mounted buckle (accepting the adjustable tongue); and a seat-mounted static tongue, each of which is further described along with the system of the invention as a whole, in the following.

Figure 1:
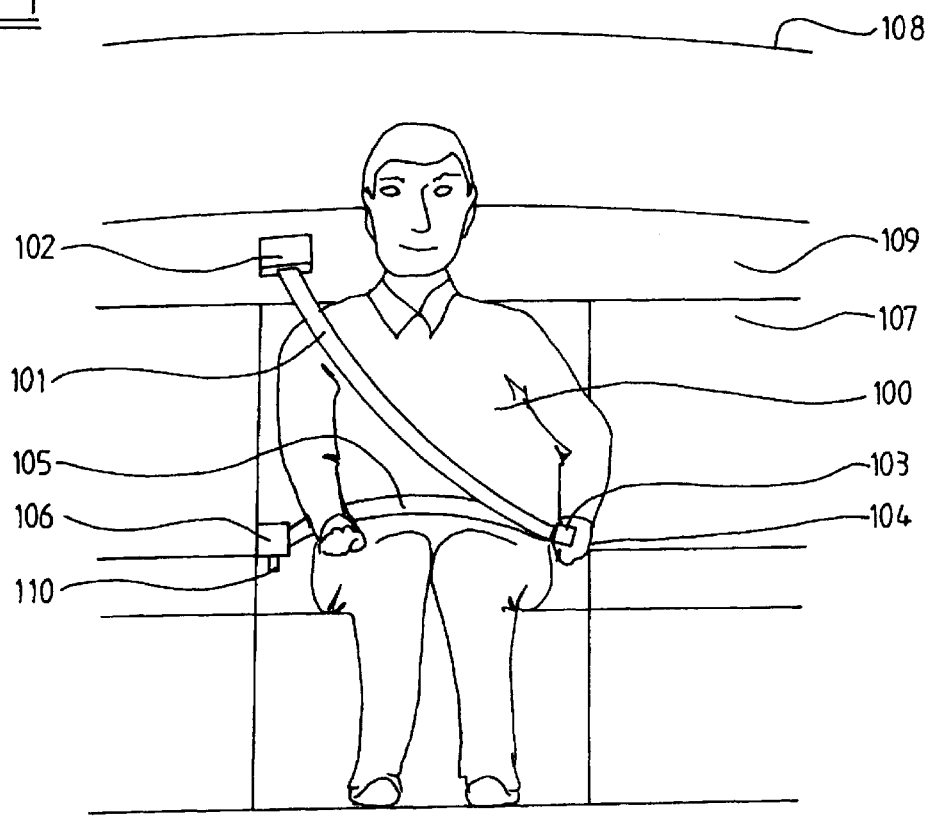
FIG. 1 depicts a front view of a vehicle incorporating the preferred embodiment of the detachable three-point seat belt system of this invention.
Figure 2:
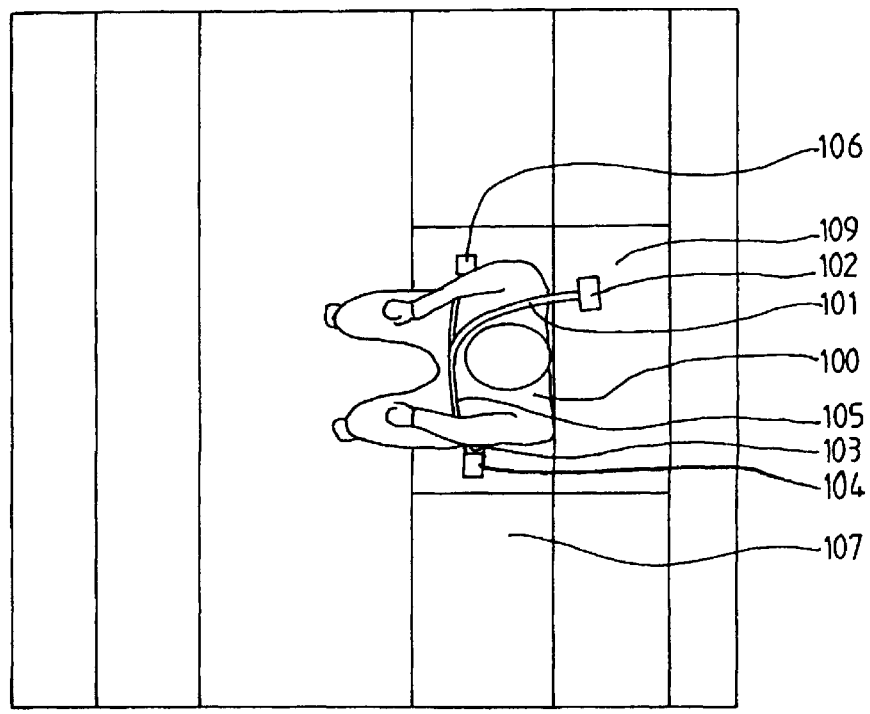
FIG. 2 depicts a plan view of a vehicle incorporating the preferred embodiment of the detachable three-point seat belt system of this invention.

FIG. 1 shows a front view of the preferred embodiment of the invention installed in a vehicle incorporating the preferred embodiment of the detachable three-point seat belt system of this invention. The body mounted retractor 102 is shown fastened to a shelf 109 behind the rear passenger seat 107 of the vehicle 108. Equivalently and alternatively, the body-mounted retractor 102 could be fixed to any mechanically suitable location behind any occupant seat, such as a roll bar, the vehicle roof or the equivalent. Extending from the body mounted retractor 102 is the shoulder belt 101 which, when in the attached configuration, extends across the upper body of the vehicle occupant 100, who is seated on a standard vehicle seat 107, to the buckle 104. The shoulder belt 101 is held in place in the buckle 104 by an adjustable (slip) tongue 103, attached to the shoulder belt 101, which is inserted and into and held in place by the buckle 104. The lap belt 105 is attached to the adjustable (slip) tongue 103, such that when the adjustable (slip) tongue 103 is inserted into the buckle 104, the lap belt 105 tends to be extended across and over the waist of the occupant 100. The reader should note that the shoulder belt 101 and the lap belt 105 are portions of the same belt component, which is divided into a shoulder belt portion 101 and a lap belt portion 105 when the adjustable (slip) tongue 103 is inserted into the buckle 104. Fixed to the other end of the lap belt 105 is an interlocking buckle 106. In the attached configuration shown in FIG. 1, the interlocking buckle 106 is fixed in place by the insertion of a fixed tongue 110, which is mounted to the seat 107. This view of the invention shows the vehicle seat 107 as typical bench seat, with the occupant 100 seated in the center position. This view is to be interpreted as exemplary and not as limiting. Alternatively, this invention can be used with all standard seat types and for all standard seating positions. FIG. 2 shows a plan view of a vehicle incorporating the preferred embodiment of the detachable three-point seat belt system of this invention. This view shows the occupant 100 and seat 107 in isolation and provides an alternative view of the seat belt system of this invention that more particularly shows the body mounted retractor 102 behind the occupant 100.

Figure 3:
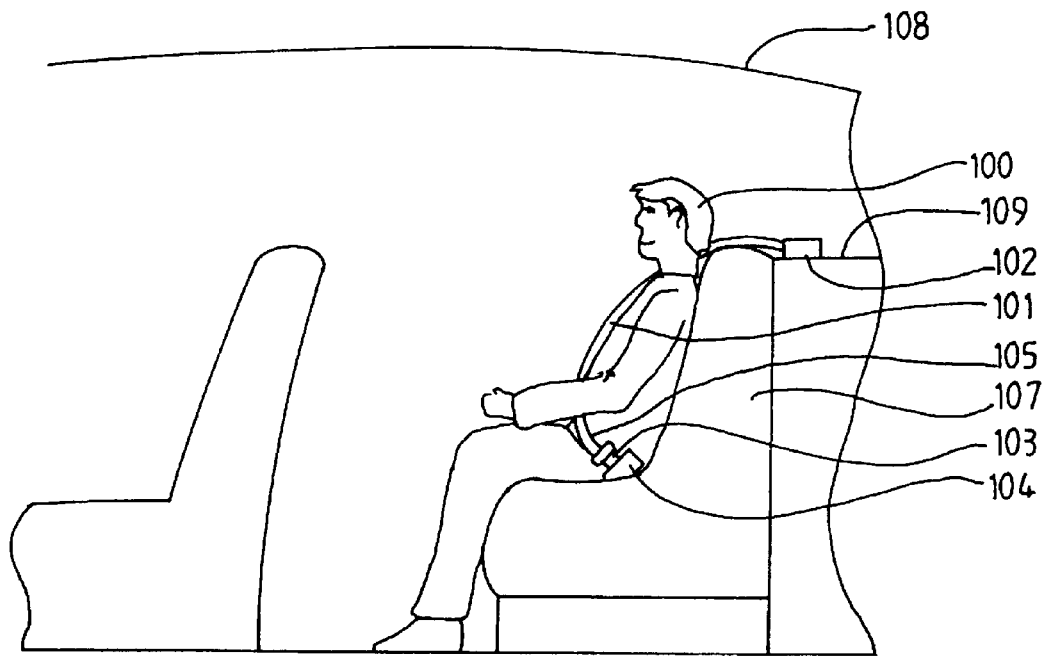
FIG. 3 depicts a side view of a vehicle incorporating the preferred embodiment of the detachable three-point seat belt of this invention.

FIG. 3 shows the side view of a vehicle incorporating the preferred embodiment of the detachable three-point seat belt of this invention. This view provides an alternative view of the occupant 100 and seat 107 in the preferred embodiment of the invention, in the rear of the vehicle.

Figure 4:
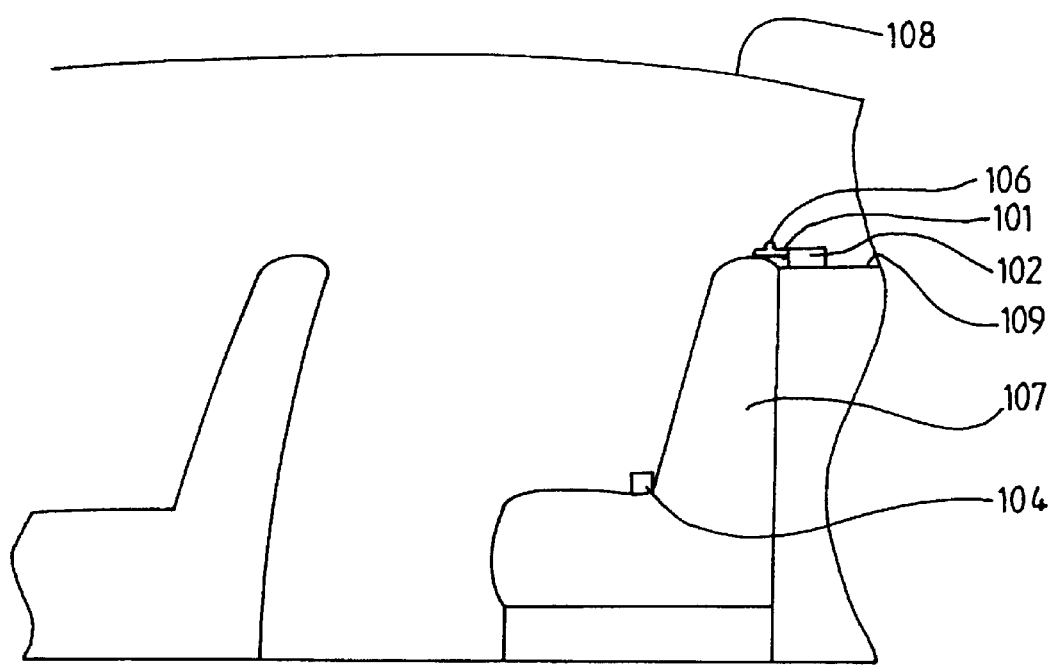
FIG. 4 depicts a side view of a vehicle incorporating the preferred embodiment of the detachable three-point seat belt of this invention, in the detached configuration.

FIG. 4 depicts a side view of a vehicle incorporating the preferred embodiment of the detachable three-point seat belt of this invention, in the detached configuration. This view of the invention shows the shoulder belt 101 retracted into the body mounted retractor 102 and the lap belt component assembly interlocking buckle 106 disconnected from the seat-mounted tongue 110. This "detached" configuration is appropriate for the situations where no occupant 100 is seated in the seat 107 and when the vehicle user desires to remove, or fold down, the seat 107 from the vehicle, as is often done with modern reconfigurable vehicles.

Figure 5:
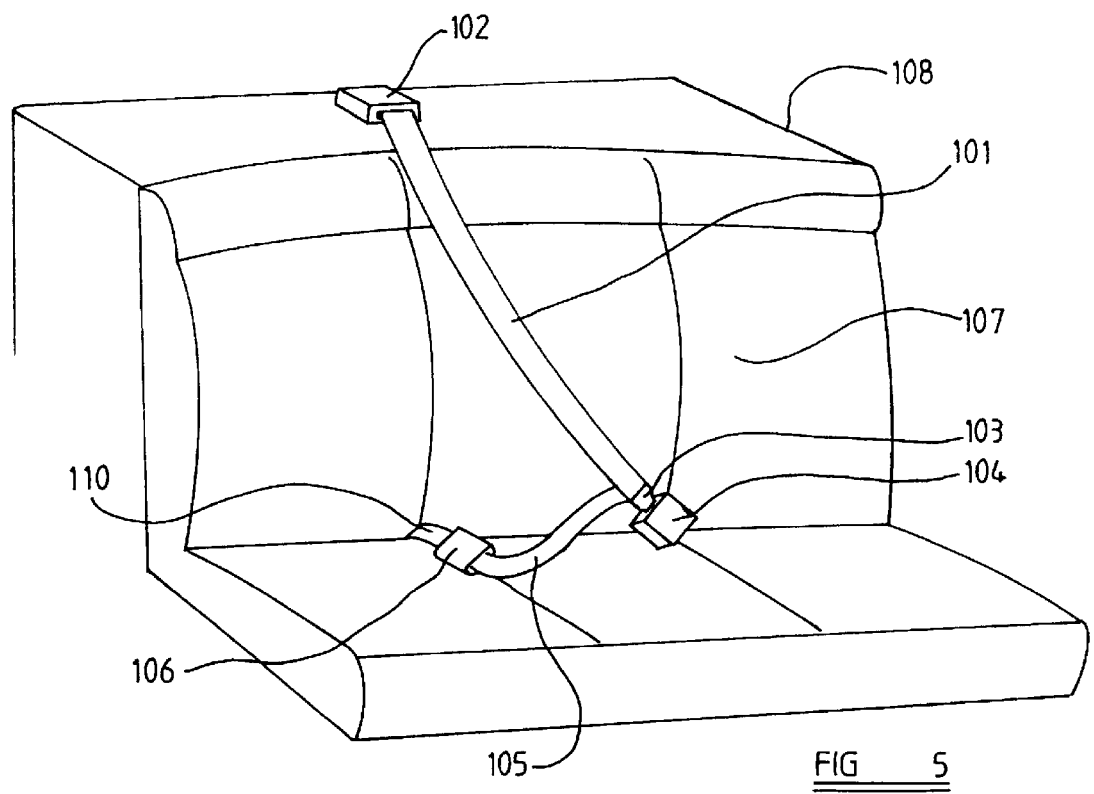
FIG. 5 depicts a view of the preferred embodiment of the detachable three-point seat belt in an attached three-point configuration.

FIG. 5 shows a more detailed view of the preferred embodiment of the detachable three-point seat belt in an attached configuration. This view shows the shoulder belt 101 extending from the body mounted retractor 102, across the seat 107, where the adjustable (slip) tongue 103 is inserted into the buckle 104. The lap belt 105 is connected to both the buckle 104, via the adjustable (slip) tongue 103, and the interlocking buckle 106. The interlocking buckle 106 is fixed to the seat-mounted tongue 110. While the preferred embodiment of the invention employs a standard tongue 110 device, alternative embodiments of the invention could use other equivalent devices to fix the interlocking buckle 106 to the seat 107. Such alternatives include but are not limited to pin, clip or spring locking devices.

Figure 6:
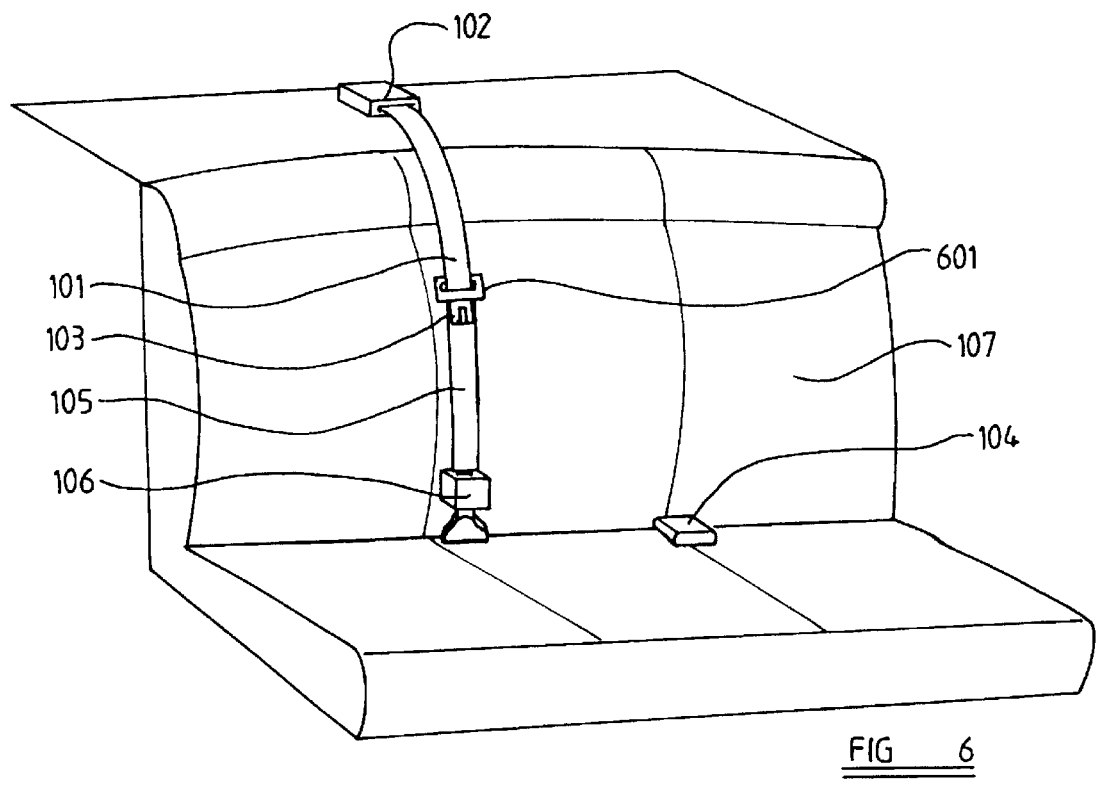
FIG. 6 depicts a view of the preferred embodiment of the detachable three-point seat belt in the attached configuration.

FIG. 6 shows a detailed view of the preferred embodiment of the detachable three-point seat belt in an unbuckled but not detached configuration. This view shows the shoulder belt 101 still extending from the retractor 102, but without the adjustable (slip) tongue 103 inserted into the buckle 104. The interlocking buckle 106 remains fixed to the seat-mounted tongue 110. The seat-mounted buckle 104 is shown disconnected. This configuration is referred to as the unbuckled configuration.

FIG. 7 shows a detailed view of the preferred embodiment of the detachable three-point seat belt in a detached and partially retracted configuration. This view shows the shoulder belt 101 retracting into the body-mounted retractor 102. The interlocking buckle 106 has been detached from the tongue 110. This detachment is preferably accomplished by inserting the adjustable (slip) tongue into a second opening 803 in the interlocking buckle 106. The preferred interlocking buckle 106 is adapted to release the tongue 110 when the adjustable (slip) tongue 103 is inserted. (Similarly, the adjustable (slip) tongue 103 is released from the interlocking buckle 106 when the tongue 110 is inserted into the interlocking buckle 106.) Once the interlocking buckle 106 is detached from the tongue 110, the retractor 102 draws the belt 101 back into the retractor 102, as shown by arrow 701.

In sum, the preferred embodiment of this invention is attached in the following manner. The occupant 100 grasps the interlocking buckle 106 from just over his shoulder and pulls it, over his shoulder, down to the tongue 110. Inserting the tongue 110 into the interlocking buckle 106, the adjustable (slip) tongue 103 is released. The occupant 100 next pulls the adjustable (slip) tongue 104 across his body, inserting the adjustable (slip) tongue 104 into the buckle 104. Since the interlocking buckle 106 is fixed to the tongue 110, a lap belt portion 105 is created between the interlocking buckle 106 and the buckle 104. The shoulder belt 101 is created between the retractor 102 and the buckle 104.

To detach and retract the three-point belt of this invention, the occupant 100, releases the adjustable (slip) tongue 103 from the buckle 104 and inserts the adjustable (slip) tongue 103 into the second window 803, see FIG. 8, of the interlocking buckle 106. Upon receipt of the adjustable (slip) tongue 103, the interlocking buckle 106 releases the tongue 110. The retractor 102 pulls the belt 101 into the retractor 102. The occupant 100 is now free to leave the vehicle 108 and/or to remove or fold down the seat 107.

Further detail of this process is found in FIGS. 8, 9, and 10, as follows.

FIG. 8 shows a detailed view of the invention in the unbuckled, but not detached configuration. In this preferred embodiment, the seat mounted buckle 104 is fixed in place via a secured strap 802, which extends through the seat 107 where the seat back meets the horizontal portion of the seat 107. Similarly, the tongue 110 is held in place via a secured strap 801, which also extends through the seat 107 where the seat back meets the horizontal portion of the seat 107. The shoulder belt 101 is shown having the adjustable (slip) tongue 103 slidably attached via a loop 601. By sliding the adjustable (slip) tongue 103 along the belt the relative proportional lengths of the shoulder belt 101 and the lap belt 105 can be adjusted. The interlocking buckle 106 is shown as it is preferably fixed to the end of the belt that is via a loop 805 available for the insertion of an end of the belt. In this figure the tongue 110 is shown inserted in the interlocking buckle 106, thereby fixing the interlocking buckle 106 to the seat 107. An opening (or window) 803 is provided to permit the insertion of the adjustable (slip) tongue 103, which when inserted releases the tongue 110.

Figure 9:
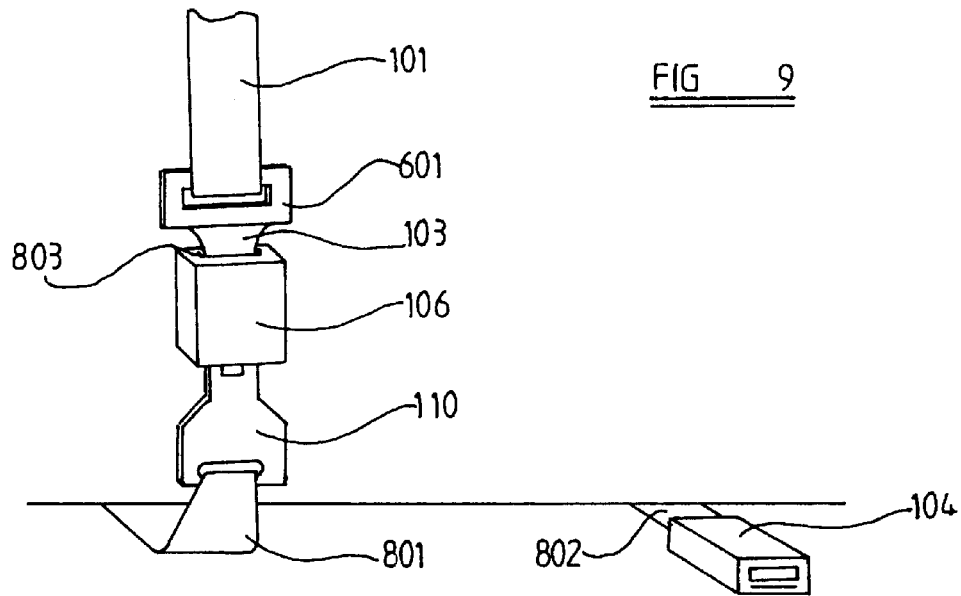
FIG. 9 depicts a detailed view of the interlocking buckle in the detached configuration of the preferred embodiment of the invention.

FIG. 9 shows the preferred embodiment of this invention when the adjustable (slip) tongue 103 is inserted into the window 803 of the interlocking buckle 106. The tongue 110 is shown being released. The reader may note that when the adjustable (slip) tongue 103 is inserted into interlocking buckle 106, no lap belt 105 portion remains. This is because the adjustable (slip) tongue 103 has been slid to the end of the belt.

Figure 10:
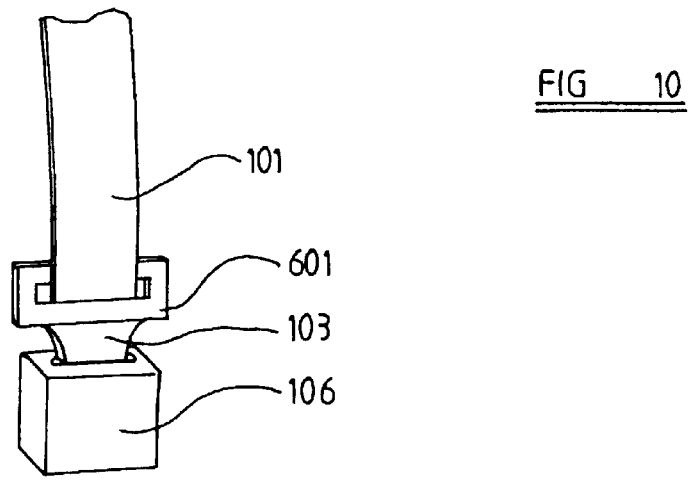
FIG. 10 depicts a view of the preferred embodiment of the invention, in a detached retracting configuration.

FIG. 10 shows the preferred embodiment of the invention after the interlocking buckle 106 has been released from the tongue 110. The belt 101 is being retracted into the retractor 102.

The described embodiment and detailed components of this disclosure are to be considered in all respects only as illustrative and not restrictive. The scope of the invention is indicated by the appended claims rather than be the foregoing description of the preferred embodiment of the invention, which is intended to provide all necessary information to enable the making and using of the applicant's invention. All changes which come within the meaning and range of equivalency of the claims are to be embraced within their scope and coverage.

What is claimed is:

1. A seat belt system comprising:
   (A) a shoulder belt retractor attached to a vehicle;
   (B) a restraint belt, having a first end and a second end, wherein said first end is connected to said shoulder belt retractor;
   (C) an interlocking buckle, having a first opening and a second opening, attached to said second end of said restraint belt;
   (D) a tongue fixed to said vehicle and adapted to permit attachment from said tongue to said first opening of said interlocking buckle;
   (E) an adjustable tongue, slidably attached to said restraint belt and adapted to permit attachment from said adjustable tongue to said second opening of said interlocking buckle; and
   (F) a buckle, fixed to said vehicle, and adapted to receive and lock said adjustable tongue.

2. A seat belt system, as recited in claim 1, wherein said adjustable tongue when received by said buckle divides said restraint belt into a shoulder portion and an lap portion.

3. A seat belt system, as recited in claim 1, wherein said shoulder belt retractor exerts a retraction force on said restraint belt capable of drawing said restraint belt into said retractor.

4. A seat belt system, as recited in claim 1, further comprising an occupant seat, fixed to said vehicle.

5. A seat belt system comprising:
   (A) a shoulder belt retractor attached to a vehicle;
   (B) a restraint belt, having a first end and a second end, wherein said first end is connected to said shoulder belt retractor;
   (C) an interlocking buckle attached to said second end of said restraint, said interlocking buckle having a first opening adapted for receiving a tongue and a second opening adapted for receiving an adjustable tongue in order to permit said restraint belt to be retracted by said shoulder belt retractor;
   (D) said tongue fixed to said vehicle and adapted to permit attachment from said tongue to said interlocking buckle;
   (E) said adjustable tongue, slidably attached to said restraint belt; and
   (F) a buckle, fixed to said vehicle, and adapted to receive and lock said adjustable tongue.

6. A safety restraint system for a vehicle comprising:
   (A) a safety restraint belt fixed to said vehicle, wherein said safety restraint belt has a slip tongue attached to said safety restraint belt and an interlocking buckle fixed to said belt, said interlocking buckle having a first opening for receiving said slip tongue and a second opening for receiving a fixed tongue;
   (B) an occupant seat attached to said vehicle;
   (C) a means for retracting said safety restraint belt;
   (D) a means for attaching said safety restraint belt to a first position on said occupant seat, wherein said first position comprises said safety restraint belt being connected to said means for retracting, a buckle and said fixed tongue, thereby forming a shoulder belt portion and a lap belt portion;
   (E) a means for detaching said safety restraint belt from said first position on said occupant seat, by removing said slip tongue from said buckle;
   (F) a means for attaching said safety restraint belt to a second position on said occupant seat, wherein said second position is said safety restraint belt being connected to said means for retracting and said fixed tongue and buckle being disconnected from said safety restraint belt;
   (G) a means for detaching said safety restraint belt from said second position on said occupant seat, by removing said interlocking buckle from said fixed tongue thereby releasing said safety restraint belt from said fixed tongue.

7. A safety restraint system for a vehicle, as recited in claim 6 wherein said means for retracting said safety restraint belt further comprises a means for providing both retraction force on said safety restraint belt as well as tension release for occupant comfort.

8. A safety restraint system for a vehicle, as recited in claim 6 wherein said means for attaching said safety belt to a first position comprises a means for attaching either but not both of said slip tongue and said fixed tongue to a first end of said safety restraint belt.

9. A safety restraint system for a vehicle, as recited in claim 6, wherein said slip tongue is slidably attached to said safety restraint belt.

10. A safety restraint system for a vehicle, as recited in claim 6, wherein said fixed tongue is fixed to said vehicle.

* * * * *